(12) United States Patent
Schwarz et al.

(10) Patent No.: US 10,899,060 B2
(45) Date of Patent: Jan. 26, 2021

(54) METHOD AND DEVICE FOR CONTINUOUSLY MODIFYING A POLYMER MELT MADE OF NON-EXTRACTED POLYAMIDE 6 WITH ONE OR MORE ADDITIVES

(71) Applicant: Technip Zimmer GmbH, Frankfurt am Main (DE)

(72) Inventors: Raimund Schwarz, Frankfurt am Main (DE); Reza Sarbandi, Frankfurt am Main (DE)

( * ) Notice: Subject to any disclaimer, the term of this patent is extended or adjusted under 35 U.S.C. 154(b) by 386 days.

(21) Appl. No.: 15/765,468

(22) PCT Filed: Jul. 27, 2016

(86) PCT No.: PCT/EP2016/067959
§ 371 (c)(1),
(2) Date: Apr. 2, 2018

(87) PCT Pub. No.: WO2017/054957
PCT Pub. Date: Apr. 6, 2017

(65) Prior Publication Data
US 2018/0250867 A1   Sep. 6, 2018

(30) Foreign Application Priority Data
Oct. 1, 2015   (DE) .......................... 10 2015 116 724

(51) Int. Cl.
*B29C 48/67* (2019.01)
*B29C 48/76* (2019.01)
(Continued)

(52) U.S. Cl.
CPC .............. *B29C 48/767* (2019.02); *B29B 7/04* (2013.01); *B29B 7/482* (2013.01); *B29B 7/88* (2013.01);
(Continued)

(58) Field of Classification Search
CPC ..... B29C 48/767; B29C 48/297; B29C 48/67; B29C 48/362; B29C 48/57; B29C 48/0255; B29C 48/37
(Continued)

(56) References Cited

U.S. PATENT DOCUMENTS

2014/0080951 A1   3/2014   Raman et al.
2015/0184055 A1   6/2015   Raman et al.

FOREIGN PATENT DOCUMENTS

DE   1604368 A1   9/1970
DE   4039857 A1   4/1992
(Continued)

*Primary Examiner* — Jeffrey M Wollschlager
*Assistant Examiner* — Xue H Liu
(74) *Attorney, Agent, or Firm* — Troutman Pepper Hamilton Sanders LLP

(57) ABSTRACT

A method and a device for admixing additives into a polymer melt made of non-extracted polyamide 6 are disclosed. The polymer melt is combined in a highly concentrated form with an additional melt flow without additives and mixed therewith. Additionally, a part of the melt is branched off from a main melt flow (3), wherein the sub-melt flow (4) is transported into a dispersing device (5) and is supplied and mixed with one or more additives (12). The side-melt flow (4) with additives is then returned into the main melt flow (3), mixed with the main melt flow, and subsequently supplied for further processing.

18 Claims, 2 Drawing Sheets

(51) Int. Cl.
  *B29C 48/57*   (2019.01)
  *B29C 48/285*  (2019.01)
  *B29B 7/04*    (2006.01)
  *B29B 7/48*    (2006.01)
  *B29B 7/88*    (2006.01)
  *B29C 48/36*   (2019.01)
  *B29B 7/84*    (2006.01)
  *B29C 48/37*   (2019.01)
  *B29C 48/025*  (2019.01)
  *C08L 77/00*   (2006.01)

(52) U.S. Cl.
  CPC .......... *B29C 48/297* (2019.02); *B29C 48/362* (2019.02); *B29C 48/57* (2019.02); *B29C 48/67* (2019.02); *B29B 7/84* (2013.01); *B29C 48/0255* (2019.02); *B29C 48/37* (2019.02); *C08L 77/00* (2013.01)

(58) Field of Classification Search
  USPC .................................................. 264/211.21
  See application file for complete search history.

(56) References Cited

FOREIGN PATENT DOCUMENTS

| | | |
|---|---|---|
| DE | 19925246 A1 | 12/2000 |
| DE | 102007029010 A1 | 2/2008 |
| DE | 102007060338 A1 | 7/2008 |
| DE | 102007013273 A1 | 9/2008 |
| EP | 0410650 A1 | 1/1991 |
| EP | 0852533 B2 | 9/2005 |
| EP | 2532698 A1 | 12/2012 |
| TW | 201302851 A1 | 1/2013 |
| WO | WO2008045754 A2 | 4/2008 |
| WO | WO2012168252 A1 | 12/2012 |
| WO | WO2014179035 A1 | 11/2014 |
| WO | WO2014141978 A1 | 2/2017 |

METHOD AND DEVICE FOR CONTINUOUSLY MODIFYING A POLYMER MELT MADE OF NON-EXTRACTED POLYAMIDE 6 WITH ONE OR MORE ADDITIVES

CROSS-REFERENCES TO RELATED APPLICATIONS

This application is the U.S. National Stage of International Application No. PCT/EP2016/067959, filed Jul. 27, 2016, which designated the United States and has been published as International Publication No. WO 2017/054957 A1 and which claims the priority of German Patent Application, Serial No. 10 2015 116 724.7, filed Oct. 1, 2015, pursuant to 35 U.S.C. 119(a) (d).

BACKGROUND OF THE INVENTION

The invention relates to a method and a device for admixing additives into a polymer melt, which is combined in a highly concentrated form with a further melt flow without additives and mixed therewith. This melt, back-mixed to a required final concentration, is ultimately fed to various end uses.

The background of the invention is the lack of flexibility of large-scale polymer plants, for example those encountered in the polyamide 6 (PA 6) field. For certain end uses, polymers are specifically provided with functional and/or color additives to impart a desired color to the polymer, to influence its mechanical, optical, or haptic properties, to provide flame retardant or antistatic properties, and the like. For this purpose they are for example mixed with a $TiO_2$ pigment or blackened with carbon black. If these additives are already added during the polymer production process, as is customary, the entire melt-carrying part of the production plant is naturally contaminated with the respective additive. Switching to other additives or to a product with different additives requires an extensive and lengthy cleaning process of the entire production plant, rendering such systems, which usually have very high throughput capacity, very inflexible.

Therefore, processes are desirable which allow additizing only after the polymerization has been completed and thus ensure flexibility for differently additized end products while at the same time enabling rapid product changes.

The polyamide 6 produced via the polymerization process contains, directly after completion of the polymerization, still a proportion of about 10% by weight of low molecular weight substances, so-called extracts. These must be largely removed i.e., extracted, in order to obtain a processable product for further processing. The non-extracted PA 6 leaving the polymerization process is thus an intermediate in the value-creation chain.

There are various prior art methods for rendering large-scale plants more flexible. DE 1 604 368 A1 describes the addition of masterbatch in a melt flow. However, a disadvantage of this method is that the material is subjected to handling to some degree and thus always involves the risk of contamination and re-melting leads to a reduction in quality as a result of polymeric degradation. Moreover, there are additional costs for drying the granules and higher costs for the separate production of the masterbatch.

In a further method (Chemical Eng., Progress 78 (1982) 1, 62 et seq.), the polymer granulate as well as additives, such as $TiO_2$, are added together to the first extruder zone. In this case, there is always the problem of a possible compacting of the additives between the granules. It is usually very difficult to dissolve this compaction in the dispersing process and, due to the required high shear rates, usually leads to an undesirable reduction in molecular weight of the matrix polymer. In addition, this procedure usually uses a premix of the various substances. In a premix, however, there is always the risk of segregation of the individual substances contained in the premix.

In another method, melt from the polymerization process is fed into a melt line, from which a side-flow is branched off to a dispersing extruder. The melt flow is recycled after incorporation of the additives back into the main flow of melt where they are mixed (Chemiefaser/Textilindustrie 1 (1986) 24 et seq.). Temporally and locally after feeding the melt into the extruder, additives, including $TiO_2$, are added directly from above into the melt. The thermals or the rising outgassing products from the melt hereby have a negative effect. Admixed additive has a gluing effect and the flowability deteriorates. This leads to inhomogeneities in the local and temporal additive distribution in the end product and additive agglomerates are generated, which then clog the melt filter and also cause an increased thread break rate in a subsequent spinning process.

DE 40 39 857 A1 describes a further development of the method described in "Chemiefaser/Textilindustrie 1 (1986) 24 et seq." To avoid thermal bonding of the additives in the feed area and thus inhomogeneities in the final product, the additives, such as $TiO_2$, are dosed from above a downpipe into the first extruder housing. Downstream, polymer melt, preferably consisting of polyethylene terephthalate (PET) or PA 6, is added via a melt pump. The polymer melt is previously diverted from a main melt line. The additives are dispersed in a twin-screw extruder, the melt treated with additive is returned to the main melt line, mixed with the main melt flow in the main melt line and diluted to the desired final concentration. The screw elements in the additive-dosing area were abraded to prevent compaction effects.

The aim of the invention disclosed in DE 40 39 857 A1 was to realize an agglomerate-free modification of the melt and thus extended filter life. According to the description in DE 40 39 857 A1, significantly lower screw speeds are required according to the invention for this than in the prior art. Thus, owing to the lower shear, only a minimal and constant reduction of the viscosity of the polymer melt is obtained and, moreover, the thermal problem does not arise, which is intended to prevent limitation of the amount of added additive. The same reasoning can be found in WO 2012/168252 A1. The advantage of the inventions according to DE 40 39 857 A1 and WO 2012/168252 A1 is thus that for example $TiO_2$ can be dispersed without having to resort to high rotational speeds.

According to the description high speeds lead to polymer degradation or to reduced viscosity until the polymer becomes entirely useless. Thus, screw speeds for polyester of 250 min- and for PA 6 of even only 150 $min^{-1}$ are used. Higher speeds were not considered for maintaining viscosity. As a result of the used low rotational speeds required for the described process, the machine throughput is consequently low or lower than would be possible if the rotational speeds could be increased without loss of quality. Thus highest possible rotational speeds would be desirable while maintaining or, ideally, improving the product properties. In addition, DE 40 39 857 A1 gives no indication of end product qualities such as a Full Dull additizing, which for example correspond to a $TiO_2$ end product concentration of 1.7 to 1.8 wt. % in the case of PA 6.

For PET in Example 3, $TiO_2$ side-flow concentrations of at most 16% by weight are described, but this melt is diluted to a Semi-Dull final concentration of 0.4% by weight. Information about the much more demanding Full Dull end product is completely missing. However, the re-dilution is known to be an extremely critical point of the process. Particulate additives such as $TiO_2$ are usually dispersed in the dispersing unit to a defined degree of homogenization or to a defined particle size. However, as soon as they leave the dispersing zone of the compounder, additives such as $TiO_2$ tend to form larger, cohesive particle accumulations due to their polarity, i.e., re-agglomeration occurs.

Re-agglomeration is the greater the higher the additive concentration in the melt and usually presents a major problem. Experience has shown that side-flow concentrations of 15 wt. % and more with respect to a Full Dull end product form such large re-agglomerates that melt filters must be replaced early and/or problems in further processing arise. For example, if not filtered out, re-agglomerates lead to increased thread breakage in the spinning mill. However, if the re-agglomerates occur in large numbers and are filtered out, the result is a significant shortening of the filter life.

This re-agglomeration begins immediately after the actual dispersion process in the compounder and occurs in the following aggregates and pipelines. Although mixing of the high concentrate from the side-flow with the main flow results in a lateral distribution of the re-agglomerates, they are not fragmented in the static mixer. Once formed re-agglomerates retain their size and must be filtered out, which quickly has a very negative effect on the efficiency of the process.

In addition, the low rotational speeds used also negatively impact the economy of the process because of the low throughputs associated therewith. However, for quality reasons low speeds are required in DE 40 39 857 A1. In addition, in particular for PA 6 according to Example 2, only a side-flow concentration of 4% by weight is suggested, which is diluted to a final concentration of only 0.6% by weight, which renders the entire extrusion system with associated peripherals, such as melt line, pumps etc. very big and expensive.

For good dispersion, the time of interaction of the polymer melt, in particular with generators of high shear rates such as kneading blocks, also plays a role, but also the shear rate, which is adjusted via the rotational speed of the screw. Thus a suitable screw design enables achieving a high shear rate, even at low rotational speed. This is superimposed with the rotational speed of the screw shafts. Neither DE 40 39 857 A1 nor WO 2012/168252 A1 achieve producing an acceptable end product also at high machine throughput via adjusting possible parameters. WO 2012/168252 A1 fully embraces the content of DE 40 39 857 A1. A further development of the dispersion and the degradation behavior was expressly excluded in the context of WO 2012/168252 A1. Full-Dull end products, which could be generated via back-mixing in the melt main flow, have not been investigated.

DE 10 2007 060 338 A1 discloses a further possibility of additizing via a twin-screw extruder, which can also be used in the side-flow. In this case, additives such as $TiO_2$ are fed to the main extruder via a side extruder. Both the side extruder and partial sections of the main extruder have a defined conveying gap between the screw elements and an increased distance from the housing wall in order to prevent compaction of the $TiO_2$, in particular during the feed to the twin-screw extruder. However, DE 10 2007 060 338 A1 does not disclose any information regarding the rotational speeds, throughputs, shear rates or polymer end product qualities used. Neither back-mixing with a main flow of melts nor any end products such as Semi-Dull or Full-Dull modified PA 6 are described. DE 10 2007 060 338 A1 relates exclusively to feeding pigments to the dispersion process while avoiding compaction effects during the feed.

According to EP 0 852 533 B2, a high torque density of greater than 11 $Nm/cm^3$ is used with a simultaneously high screw speed of at least 800 rpm with a $D_a/D_i$ (outer diameter/inner diameter) of 1.5 to 1.6. The torque density per screw is defined as the quotient of the torque of the single screw and the cube of the axial distance of the two screws of the twin-screw extruder ($M_d/a^3$). In accordance with the approximate formula given in EP 0 852 533 B2 for calculating the mean shear rates $$\bar{\gamma} = 2\pi \cdot n_s \cdot \frac{(D_a/D_i)}{(D_a/D_i) - 1}$$

(with $n_s$ = screw rotational speed)

this results in an approximate average shear rate of well over 150 $s^{-1}$. The residence time in the extruder is reduced, which should then simultaneously lead to a low polymer degradation. For this purpose, a very high torque density is required with simultaneously adapted screw configuration in order to achieve a high throughput. However, specific polymers and their qualities are not addressed. Likewise, no back-mixing with a main flow of polymer is disclosed. As with all documents described above, no non-extracted intermediate was processed here, only the finished extracted end product. Since the field of application of the disclosed invention is conventional masterbatch production, the processing of non-extracted PA 6 intermediate was also not relevant to this application. Consequently, no particle sizes or other quality features are mentioned for a back-mixed product, in particular not for non-extracted PA 6. The description of the features essential to the invention relates above all to the continuous mixing in the solids conveying field, to the grinding of coarse-grained bulk materials to powder and to the conventional masterbatch production.

The peculiarity of additizing non-extracted PA 6 is that the high proportion of low molecular weight substances influences the rheological properties. Thus, for example, admixtures of substances in the small to very small percentage range, in particular in the case of polymers, can influence the physical properties. In the case of non-extracted PA 6, the amount of low molecular weight substances is even in a proportionately very high range. Accordingly, it is unpredictable how the non-extracted material will behave during the additizing, e.g. in terms of dispersion, re-agglomeration and polymeric degradation.

SUMMARY OF THE INVENTION

Based on the described prior art and the disadvantages therein, it was the object of the present invention to provide, specifically for non-extracted PA 6, an improved method and apparatus for additizing a polymer melt, which allow high additive concentrations, in particular of $TiO_2$, in the side-flow, and which allow generating a high quality end product after re-dilution also for Full Dull applications with fast product changes without viscosity reduction and at high throughput, and thus have a much higher efficiency also owing to a comparatively better product.

This object is achieved by a method and a device according to the independent claims. Further advantageous embodiments of the invention can be found in the dependent claims.

The unexpectedly good end results of the method according to the invention may, inter alia, also be achieved in conjunction with the composition of the non-extracted intermediate product, which usually does not find use in a compounding process, and the resulting rheological properties.

DETAILED DESCRIPTION OF PREFERRED EMBODIMENTS

Figure 1:
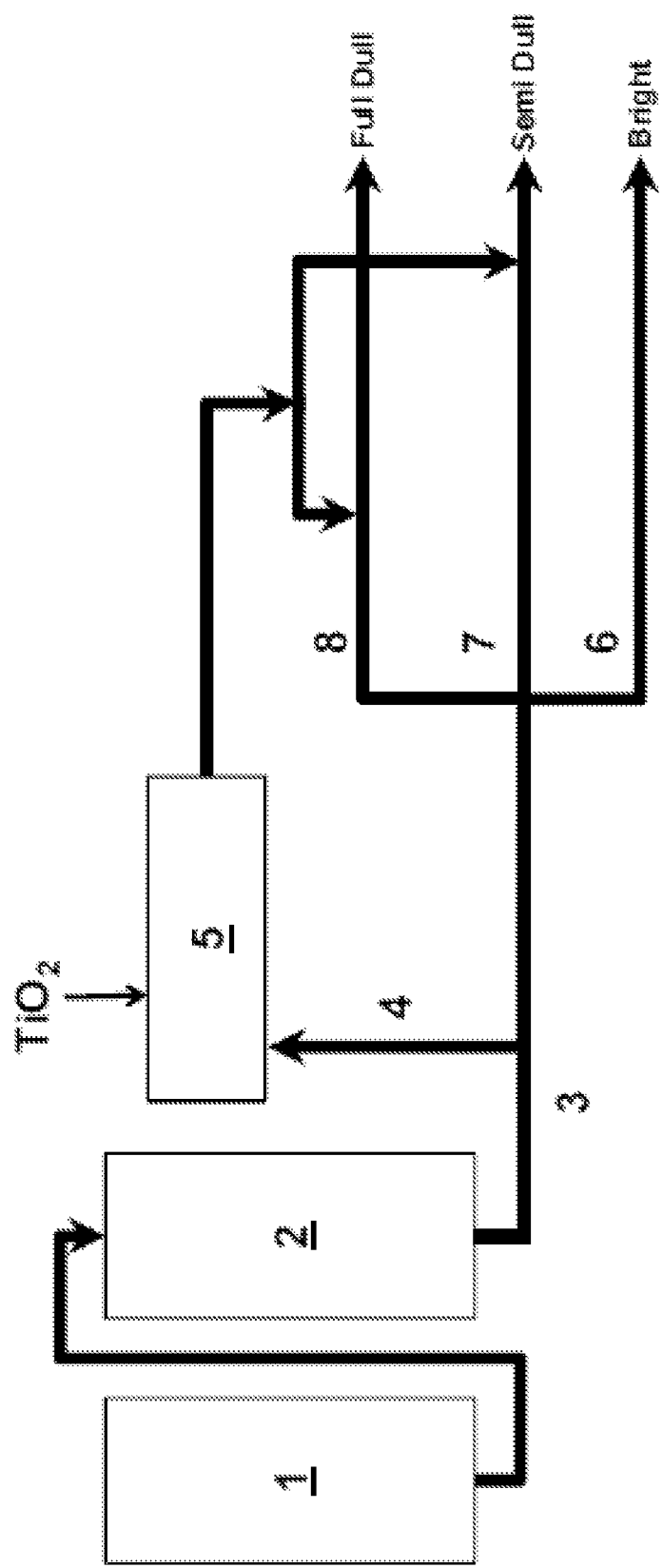
FIG. 1 shows a schematic illustration of a process sequence according to the invention.

The process sequence will be described below with reference to FIG. 1. According to the invention, non-extracted polyamide 6 melt is conveyed from a one- or two-stage polymerization plant (in FIG. 1, by way of example, a two-stage plant having a first stage (1) and a second stage (2)) is conveyed through a main melt line (3), from which a partial melt flow (4) is branched off and metered via a melt pump (not shown in FIG. 1) into a dispersing device (5). The dispersing device (5) is preferably a twin-screw dispersing extruder or a compounder. Downstream, one or more additives, shown in FIG. 1 exemplarily for $TiO_2$, are metered via a side feeder to the dispersing device (5), where they are first wetted with melt and subsequently dispersed. An example of a side feeder can be found in "The twin-screw extruder: Basics and applications/Publisher: Association of German engineers, VDI Society Plastics Technology—4th revised edition—Dusseldorf, VDI-Verlag, 1998, page 63". According to the invention, the additives are dyes and pigments, antistatics, antiblock additives, slip additives and/or flame-retardant additives, most preferably $TiO_2$, carbon black, inorganic color pigments or silica/siliceous earths. Shortly before the melt discharge, it is optionally possible to degas before the melt is conveyed out of the dispersing device (5) after further mixing.

Subsequently, the mixture is fed to a further melt pump (not shown in FIG. 1) behind the dispersing device (5), metered back into the main melt line (3) where it is again statically mixed once more. In order to achieve different degrees of matting, the main melt line (3) can advantageously be divided into, for example, main melt partial flows (6, 7, 8) for a Bright, Semi Dull and Full Dull product, and then, corresponding quantities of the melt partial flow (4) for the Semi Dull and Full Dull product are fed or further transported for further processing for the Bright product without addition from the melt partial-flow (4).

In contrast to the configuration described in DE 40 39 857 A1, the additive is not introduced into the first extruder housing, but downstream via a side feeder. The advantage of the use according to the invention of a side feeder is that the rotational speed of the side feeder screws can be set separately from the speed of the compounder. In the process described in DE 40 39 857 A1, this is not possible. Bonding, as described for the process of "Chemiefaser/Textilindustrie 1 (1986) 24 et seq." does not occur. A supply of the additive in the first housing of the extruder, as described in DE 40 39 857 A1, is thus not required.

In addition, it has surprisingly been found that it is also possible to dispense with a side-feeder in an embodiment as described in DE 10 2007 060 338 A1. An elaborate grinding of screw elements, as found necessary in DE 40 39 857 A1, or the use of a conveying gap to prevent compacting effects during feeding, as disclosed in DE 10 2007 060 338 A1, is surprisingly not required. Thus standard feed equipment can be used, which further increases the efficiency of the process.

Since the new method uses a melt charge, the torque density in the disperser (5) is small. It is preferably less than 10 $Nm/cm^3$. The mean shear rates, calculated according to the above-mentioned approximation formula from EP 0 852 533 B2, are significantly greater than 150 $s^{-1}$ at a ratio $D_a/D_i$ of 1.48 present in the examples below. Preferably, in the dispersing device (5) an average shear rate calculated from the approximation formula of 150 to 1800 $sec^{-1}$, more preferably from 250 to 1500 $sec^{-1}$, most preferably from 350 to 1200 $sec^{-1}$ is used.

The additive concentration in the melt side-flow (4) prior to back-mixing with the main melt flow (3) is preferably 10-30 wt. %, more preferably 14-25 wt. %, most preferably 17-22 wt. %.

Preferably, the additive concentration in the main melt flow (3) or the main melt side-flows (7, 8) after admixing the melt partial flow (4) is 0.03 to 3 wt. %, particularly preferably 1.5 to 2.3 wt. %, most preferably 1.7 to 2.0 wt. %. The produced product is preferably a Full Dull product (in the case of PA 6 corresponding to 1.7-1.8 wt. % of $TiO_2$).

The maximum size of the additive particles, in particular for the case of $TiO_2$ particles, in the back-mixed end product is preferably 5 μm, more preferably 3 μm.

Figure 2:
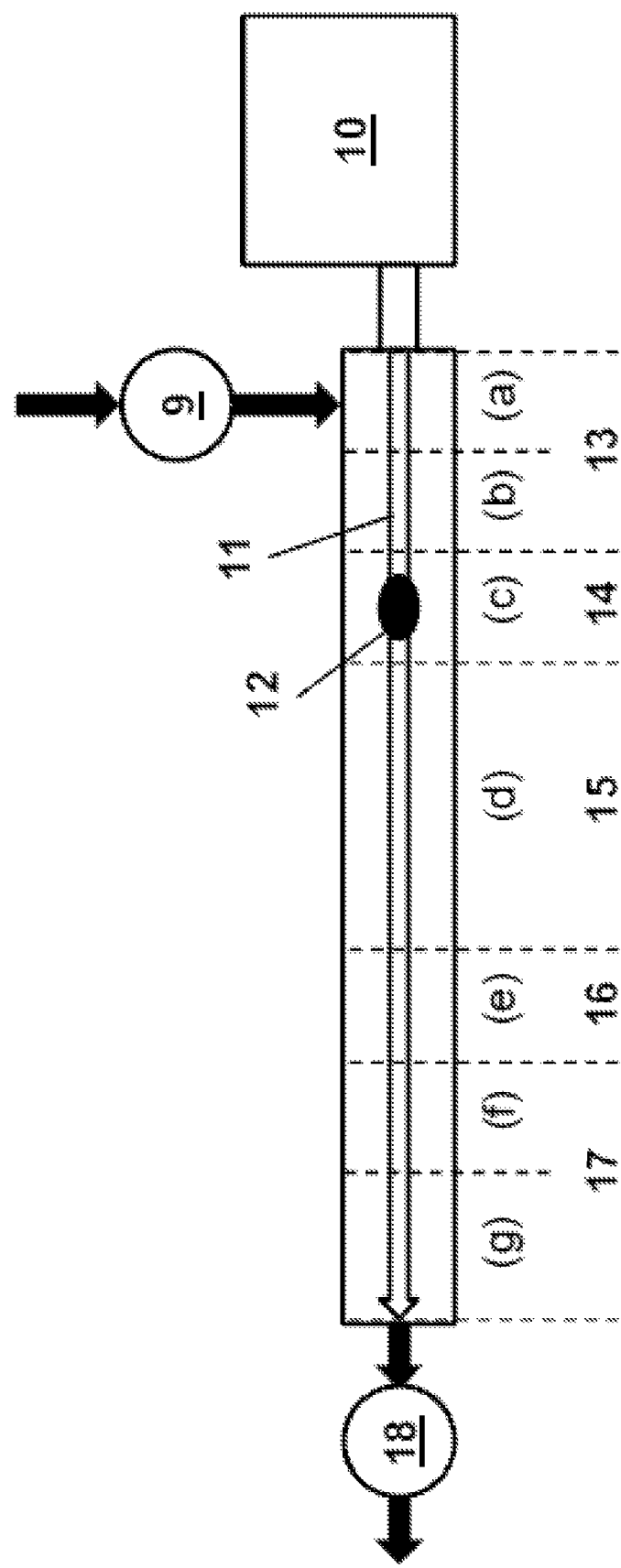
FIG. 2 shows a schematic illustration of the construction of a dispersing device according to the invention

The construction of a dispersing device (5) according to the invention and its melt supply and discharge is shown by way of example in FIG. 2. The extruder used in the examples described below is a compounder of the ZE25A-48D-UTX type from KraussMaffei Berstorff GmbH. The screw structure of the twin screw (11) of the compounder driven by the extruder drive (10) has the following five regions with different treatment zones: a first region (13) with a zone (a) for feeding the non-extracted PA 6 by means of the melt pump (9), thereafter downstream optionally alternating kneading blocks and in any case conveying elements (b). The kneading blocks can be designed to be conveying, neutral or backward-conveying in the entire process, depending on the process requirement. This is followed downstream in a second region (14) by a zone for introducing the additive (c) via a side feeder device connected to the connection for the side feeder (12), with subsequent wetting. Following thereafter, in a third region (15), are again alternately kneading blocks and conveying elements for optimal dispersion, followed by partially permeable conveying elements (zone (d)), which can be designed to rotate forward or backward. This is followed in a fourth region (16) by a closable degassing zone (e) equipped with conveying elements or partially permeable conveyor elements, followed in a fifth region (17) by mixing elements such as pulleys, which may also be configured for backward or forward rotation, in zone (f). Finally, subsequent thereto in zone (g) the highly concentrated melt is discharged from the compounder via conveying elements. After the dispersing device (5), the additized melt is further transported by means of the melt pump (18).

The mentioned sequence of the five areas with the treatment zones is predetermined according to the invention, but the exact screw structure can be adapted in detail to the respective polymer and additive properties as well as the desired additive loading by means of the abovementioned options.

In the examples, a $TiO_2$ product with the name "Hombitan LO-CR-S-M W/O Si" from the company Sachtleben was used.

The comparative example is a commercially available Full Dull PA 6 product from LiHeng (Changle) Polyamide Technology Co., Ltd., which is used by LiHeng as a raw material for various yarns. It is a finished, extracted PA 6 polymer in which the low molecular weight fractions were removed by extraction prior to the additizing. This example serves for comparing the $TiO_2$ particle size distribution.

Table 1 summarizes the experimental data for the preparation of the examples in the compounder.

TABLE 1

|  | Example 1 | Example 2 | Comparative Example |
|---|---|---|---|
| Melt-entry temperture, [° C.] | 265 | 265 | — |
| Mass temperature (Exit), [° C.] | 269 | 269 | — |
| Mass pressure, [bar] | 11 | 14 | — |
| Rotational speed, [min$^{-1}$] | 1200 | 1200 | — |
| Throughput ZE25, [kg/h] | 25.5 | 12.75 | — |
| $TiO_2$-concentration in the melt partial flow, [weight.-%] | 10 | 20 | — |
| Total throughput, [kg/h] | 150 | 150 | — |
| $TiO_2$-final concentration, [weight.-%] | 1.7 | 1.7 | 1.7 |

The samples of the examples and the comparative example were characterized by Scanning Electron Microscopy (SEM) and viscometry.

In the SEM investigations, the samples were measured by scanning electron microscopy and evaluated by means of the statistical evaluation method "$x_{50}$". A description of the statistical evaluation "$x_{50}$" can be found in "The Science and Engineering of Granulation Processes", Jim Litster, Bryan Ennis, Springer Science+Business Media Dordrecht, 2004, ISBN 978-1-4020-1877-0, page 17. For the present investigations, an evaluation based on the volumetric distribution was used, which accordingly generates a higher weighting of the larger particles relevant for the clogging of melt filters than a number-based distribution. The values contained in the following Table 2 correspond to particles that are passed through in a cumulative volume-based analysis of 50% of the particles.

The actual electron microscopic measurement was carried out as follows:

For sample preparation, the chips were fixed in a sample holder and subjected to the plasma etching process. To then capture the chips, four chips were fixed in the sample holder and three images per chip or twelve images per sample were made.

The SEM measurement detects particles larger than 80 nm on a viewing area of at least 0.0074 mm$^2$. This results in a total particle number of about 500-1000 particles. The measured particles are then divided into parts >0.3 μm/>0.6 μm/>1.0 μm and evaluated as described above by means of the static evaluation $x_{50}$.

The relative viscosities were measured according to DIN EN ISO 307. The measurement results are summarized in Table 2.

TABLE 2

|  | Example 1 | Example 2 | Comparative Example |
|---|---|---|---|
| SEM (cumulative, $x_{50}$, $TiO_2$), [μm] | 0.48 | 0.45 | 0.47 |
| 3 largest $TiO_2$-Partikel (SEM), [μm] | 2.37/1.25/1.22 | 1.3/1.12/1.1 | 1.12/1.03/1.0 |
| Relative Viscosity, [—] | 2.29 | 2.30 | 2.5 |

As shown in Table 2, the novel process provided an excellent particle size distribution as compared to the commercial product. Thus, the product produced by the new process is absolutely comparable to the commercial product from a conventional production.

The relative viscosities of the samples of Example 1 and Example 2 were 2.29 and 2.30. In addition to the comparative example of Table 2, which represents the commercial product, a blank sample was taken from the non-extracted, i.e., non-extruded starting material examined. This non-extruded and non-extracted starting material had a relative viscosity of 2.25. That is, no polymeric chain degradation has occurred during the compounding process.

The measured maximum $TiO_2$ particle sizes are usually less than 2 μm after back-mixing for the Full-Dull end product. Considering that a much coarser filtration is used in a PA 6 production process, e.g. 10 μm, this is an excellent and surprising result. The use of an enhanced filtration, for example of the type that is usually essential for a Full Dull end product to obtain an acceptable end product is no longer necessary according to the new method. That is, the otherwise commonly occurring harmful re-agglomeration behind the compounder that results in particle sizes capable of clogging production filters of fineness customary in production does not occur.

The scanning electron micrographs show comparable to better values than the commercial Full Dull product, which was produced by the conventional process with $TiO_2$ addition in the polymerization process.

What is claimed is:
1. A process for the continuous modification of a polymer melt of non-extracted polyamide 6 with one or more additives, wherein a part of the melt is branched off from a main melt flow, this melt side-flow is conveyed into a dispersing device, one or more additives are added and mixed, the additized melt side-flow is then returned back to the main melt flow where it is mixed and subsequently transported for further processing, characterized in that
   the melt supplied to the dispersing device is conveyed into a first region and from there is conveyed by conveying elements into a second region;
   in the second region one or more additives are supplied via a side-feeder and wetted with the melt;
   the additives are dispersed and mixed in a third region, wherein for optimal dispersion kneading blocks and conveying elements are used alternately, followed by partially permeable conveying elements which are designed to rotate forwards and/or backwards;
   in a fourth region equipped with a closable degassing zone a degassing is performed or the melt is only conveyed;
   in a fifth region, which has backward-rotating and/or forward-rotating and/or neutral mixing elements, the additives are further mixed with the melt and then the additive-laden melt is discharged from the dispersing device via conveying elements; and the melt which is discharged from the dispersing device is conducted back into the main melt flow, where it is mixed statically and diluted to a final concentration.

2. The method according to claim 1, characterized in that the dispersing device is a co-rotating twin-screw extruder.

3. The method according to claim 1, characterized in that the mixing elements in the fifth region are toothed discs and/or partially permeable conveying elements.

4. The method according to claim 1, characterized in that the additive is $TiO_2$.

5. The method according to claim 1, characterized in that a rotational speed of screws of side feeder is adjustable independent of a rotational speed of the dispersing device.

6. The method according to claim 1, characterized in that an additive concentration in the melt side-flow prior to back-mixing with the main melt flow is 10-30 wt. %.

7. The method according to claim 1, characterized in that an additive concentration in the main melt flow after admixing the melt side-flow is 0.03 to 3%.

8. The method according to claim 1, characterized in that a shear rate of 150 to 1800 $sec^{-1}$ is used in the dispersing device.

9. The method according to claim 1, characterized in that a maximum size of the additive particles in a back-mixed end product is 5 pm.

10. The method according to claim 1, characterized in that a torque density of the dispersing device does not exceed 10 $Nm/cm^3$.

11. An apparatus for continuously modifying a polymer melt of non-extracted polyamide 6 PA with one or more additives, wherein a part of the melt is branched off from a main melt flow, this melt side-flow is conveyed into a dispersing device with at least five regions, one or more additives are added and mixed, thereafter the additized melt is conveyed again into the main melt flow, where it is mixed and subsequently conveyed to further processing, characterized in that the melt is conveyed into a first region of the dispersing device equipped with conveying elements and from there is conveyed by conveying elements into a second region;

on the second region equipped with the conveying elements a side feeder is arranged, which feeds one or more additives into the dispersing device and the introduced additives are wetted with the melt;

in a third region equipped alternately with kneading blocks and conveying elements followed by partially permeable conveying elements which are designed to rotate forwards and/or backwards, the additives are dispersed;

in a fourth region equipped with conveying elements or partially permeable a closable degassing device is arranged;

in a fifth region, which has backward-rotating and/or forward-rotating and/or neutral mixing elements followed by conveying elements, the additives are further mixed with the melt and then the additive-laden melt is discharged from the dispersing device; and the melt which is discharged from the dispersing device is conducted back into the main melt flow, where it is mixed statically and diluted to a final concentration, wherein the discharged melt is either directly conducted back into the main melt flow for producing a single additive laden melt or is divided into multiple main melt flows which are respectively conducted into the main melt flows of the main melt flow which is de divided into multiple main melt flows for producing multiple melt flows having different additives.

12. Device according to claim 11, characterized in that the dispersing device is a co-rotating twin-screw extruder.

13. Device according to claim 11, characterized in that the mixing elements in the fifth region are toothed discs and/or partially permeable conveying elements.

14. Device according to claim 11, characterized in that a rotational speed of screws of side feeder is adjustable independent of a rotational speed of the dispersing device.

15. Device according to claim 11, characterized in that an additive concentration in the melt partial flow prior to back-mixing with the main melt flow is 10-30 wt. %.

16. Device according to claim 11, characterized in that an additive concentration in the main melt flow after admixing of the melt partial flow is 0.03 to 3%.

17. Device according to claim 11, characterized in that in the dispersing device a shear rate of 150 to 1800 $sec^{-1}$ is used.

18. Device according to claim 11, characterized in that a torque density of the dispersing device does not exceed 10 $Nm/cm^3$.

* * * * *